(12) United States Patent
Reed

(10) Patent No.: US 11,827,869 B2
(45) Date of Patent: Nov. 28, 2023

(54) FLAVORING MEMBER COMBINED WITH CONTAINER CAP

(71) Applicant: Michael Arthur Reed, Lake Saint Louis, MO (US)

(72) Inventor: Michael Arthur Reed, Lake Saint Louis, MO (US)

(*) Notice: Subject to any disclaimer, the term of this patent is extended or adjusted under 35 U.S.C. 154(b) by 15 days.

(21) Appl. No.: 17/444,858

(22) Filed: Aug. 11, 2021

(65) Prior Publication Data
US 2022/0056384 A1 Feb. 24, 2022

Related U.S. Application Data

(60) Provisional application No. 63/068,346, filed on Aug. 20, 2020.

(51) Int. Cl.
*C12G 3/07* (2006.01)
*B65D 39/00* (2006.01)

(52) U.S. Cl.
CPC ............ *C12G 3/07* (2019.02); *B65D 39/00* (2013.01)

(58) Field of Classification Search
CPC ............ C12G 3/07; B65D 39/00; C12H 1/22
See application file for complete search history.

(56) References Cited

U.S. PATENT DOCUMENTS

| 2,114,009 | A | | 4/1938 | Ramsay | |
|---|---|---|---|---|---|
| 2,203,229 | A | * | 6/1940 | Nilsson | C12G 3/07 426/112 |
| 2,487,594 | A | | 11/1949 | Rudnick | |
| 3,942,423 | A | | 3/1976 | Herzfeld | |
| 4,173,656 | A | | 11/1979 | Duggins | |
| 5,647,268 | A | * | 7/1997 | Sullivan | C12H 1/22 99/277.1 |
| 7,594,468 | B2 | | 9/2009 | Kania et al. | |
| 7,866,254 | B1 | | 1/2011 | Karasch et al. | |
| 2003/0170351 | A1 | | 9/2003 | de Wet | |
| 2006/0191419 | A1 | | 8/2006 | Spoljaric et al. | |
| 2009/0068308 | A1 | | 3/2009 | Watson et al. | |
| 2011/0268838 | A1 | * | 11/2011 | Vondrasek | C12G 3/07 426/15 |
| 2013/0045300 | A1 | | 2/2013 | Robillard | |
| 2015/0197715 | A1 | | 7/2015 | Peniche | |
| 2016/0097023 | A1 | | 4/2016 | Peniche | |
| 2019/0062679 | A1 | | 2/2019 | Güldenzopf | |

* cited by examiner

*Primary Examiner* — Shawn M Braden

(57) ABSTRACT

A container cap combined with a flavoring member extending downward into a container that the container cap engages. When the container cap is operatively associated with the opening of the container, a portion of the flavoring member is immerse in a fluid of the container. The flavoring member provides one or more flavor elements adapted to be drawn into the fluid through capillarity.

11 Claims, 3 Drawing Sheets

FLAVORING MEMBER COMBINED WITH CONTAINER CAP

CROSS-REFERENCE TO RELATED APPLICATION

This application claims the benefit of priority of U.S. provisional application No. 63/068,346 filed 20 Aug. 2020, the contents of which are herein incorporated by reference.

BACKGROUND OF THE INVENTION

The present invention relates to liquid containers and, more particularly, a container cap with a flavoring member for improving the flavor of the liquid contents of the container.

The problem with storing potable liquids in portable containers, such as bottles, is that once so contained the taste of the potable liquids starts to degenerate and becomes less tasteful. For instance, for alcoholic beverages, liquor stops aging the minute it leaves the barrel and is put into a glass bottle. Because of this, the portable container decreases the liquor's chances for improved taste possibilities.

Traditional bottle tops/corks/plugs do not breathe; rather they suffocate the contained liquid, facilitating staleness. In the case of alcohol, traditional tops/corks/plugs styme the alcohol's aging process, thereby stopping possibilities for improved taste. In other words, traditional caps do not improve the taste of the contents that they container, in fact they are part of the problem. Furthermore, traditional bottle tops/corks/plugs do not breathe and have no wood in them to facilitate flavoring.

As can be seen, there is a need for a container cap combined with a flavoring member for improving the taste of the liquid contents of the container.

The present invention embodies a cap, such as a top/cork/plug, for a container, wherein the cap has a flavoring member depending therefrom so as to extend into the contained space. The flavoring member is adapted to improve the taste of potable liquids in the contained space. For alcohol, the flavoring member may be made of wood to treat alcohol in the bottle like it is still in a wooden barrel, thereby providing barrel-like aging.

In other words, the present invention embodies a flavoring member depending from a container cap. In certain embodiments, the flavoring member is received through a sealing portion of the cap. The flavoring member allows for breathing and continued aging, increasing taste while in the sealed container as if it were still in a barrel. Specifically, the container cap breathes through the flavoring member, which has a porous characteristic, and improves the taste.

SUMMARY OF THE INVENTION

In one aspect of the present invention, a cap for a container, the cap including the following: a sealing portion; and a flavoring member operatively associated with the sealing portion, the flavoring member comprising a capillary-porous media.

In another aspect of the present invention, the cap for a container further provides wherein the capillary-porous media is defined by a plurality of capillaries, wherein the plurality of capillaries comprises at least one flavoring element, wherein the at least one flavoring element is intrinsic or extrinsic to the flavoring member, wherein the sealing portion forms a sealing engagement with an opening of a container, wherein the flavoring member extends downward from the sealing portion into a compartment defined by the container, wherein the flavoring member extends downward from the sealing portion for approximately eight inches, wherein the flavoring member is received in the sealing portion, and wherein the flavoring member consists of wood.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a container cap combined with a flavoring member for improving the taste of the liquid contents of the container.

Figures 1, 2:
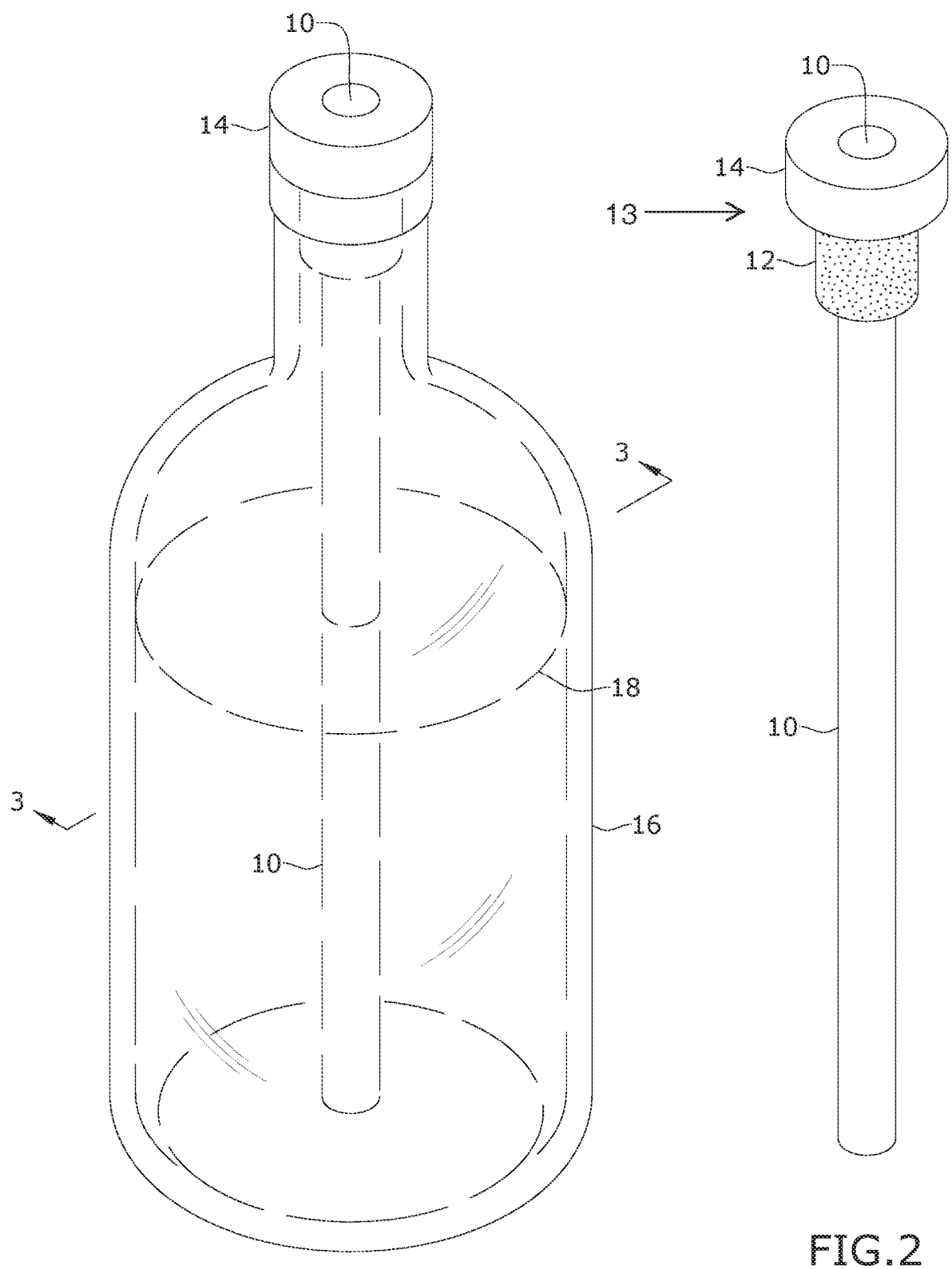
FIG. 1 is a perspective view of an exemplary embodiment of the present invention, shown in use.
FIG. 2 is a perspective view of an exemplary embodiment of the present invention.
Figure 3:
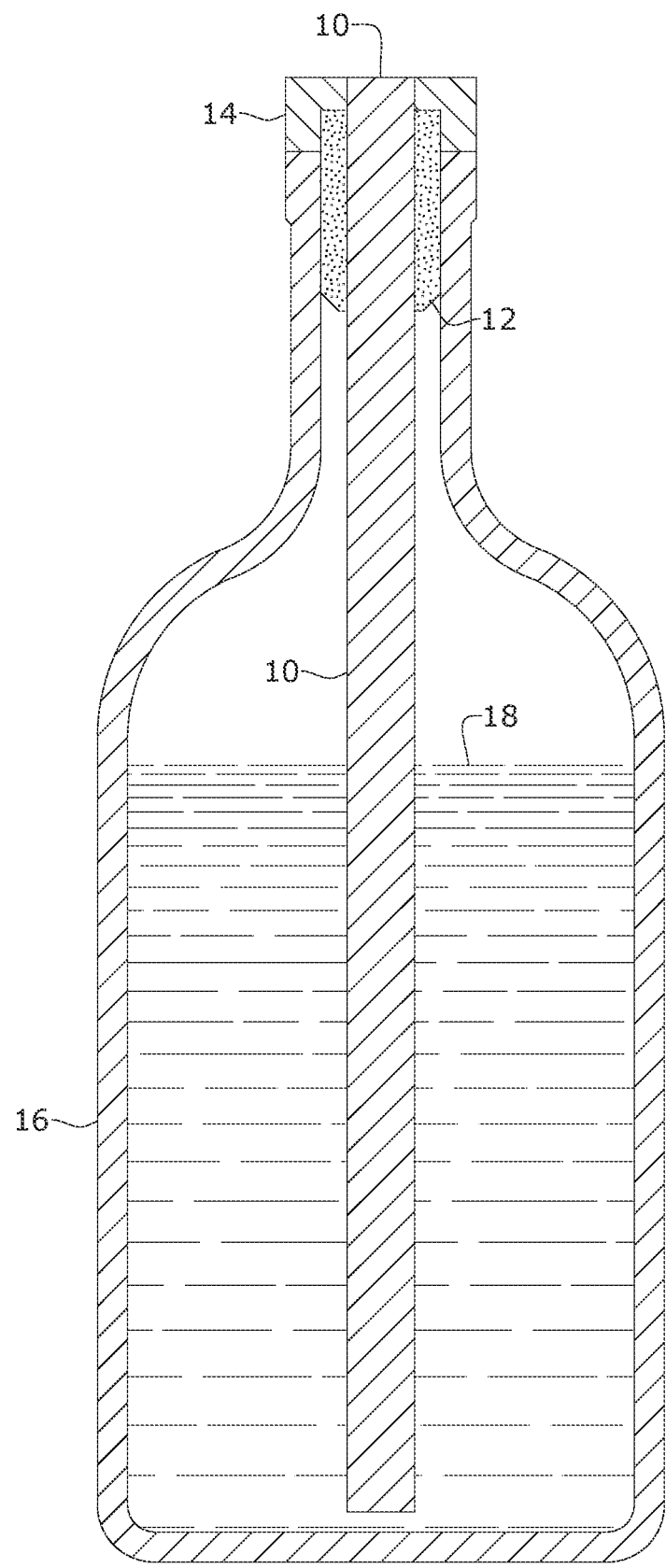
FIG. 3 is a section view of an exemplary embodiment of the present invention, taken along line 3-3 in FIG. 1.
Figure 4:
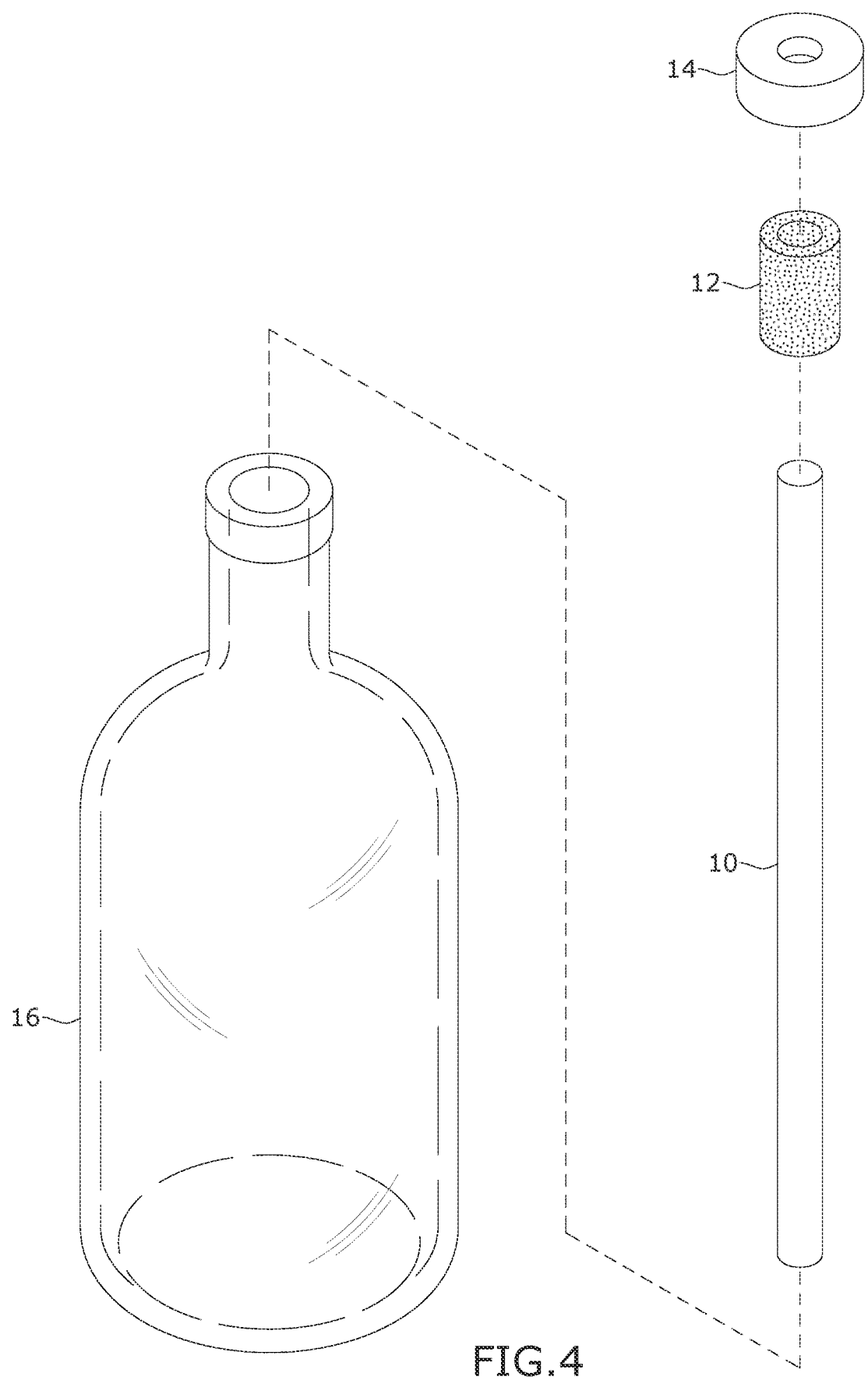
FIG. 4 is an exploded perspective view of an exemplary embodiment of the present invention.

Referring now to FIGS. 1 through 4, the present invention may include container cap 13. The container cap 13 may have an upper portion 14 and a lower portion 12. The upper portion 14 is dimensioned and adapted to circumscribe and engage an opening of a container 16. More specifically, the upper portion 14 may circumscribe the outer diameter/perimeter a structural component of the container 16, like the neck of a bottle, that defines said opening. The lower portion 12 may be dimensioned and adapted to fluidly seal against the inner diameter/perimeter of the structural component, filling the opening.

A flavoring member 12 may depend from the container cap 13 so as to extend into the compartment defined by the container 16 so that a portion of the flavoring member 12 is immersed in the fluid 18 in the compartment.

In certain embodiments, the flavoring member 10 may be received through a void in the lower portion 12 and possibly the upper portion 14. In certain embodiments, the voids of the lower and upper portions 12 and 14 align, and both receive the flavoring member 10.

The upper portion 14 may be made from any suitable material that provides durability, such as various plasticized or metallic material. The lower portion 12 may be made from any suitable material, such as rubber, cork, or the like, that provides a fluid seal by way of elasticity against rigid material.

The flavoring member 10 may be made of wood or other absorbent materials for absorbing a flavor and the fluid 18, thereby the fluid 18 extracts the flavor of the flavoring member 10. The flavoring member 10 may be porous, having porous fenestrations, each porous fenestration defines an opening having a diameter of 0.5 to 1.2 mm. As used in this application, the term "about" or "approximately" refers to a range of values within plus or minus 10% of the specified number.

A plurality of porous fenestrations may define one of a plurality of capillaries—defining a permeable capillary-porous media. The adhesive force between the water and the plurality of capillaries is stronger than the cohesive forces inside the water itself. The adhesive force pulls the water molecules into the narrow spaces/porous fenestrations within the flavoring member 10. Cohesion (forces between water molecules) ensures that other water molecules trail behind. This process is called capillary action.

In use, the upper portion 14 engages the outer diameter/perimeter of the opening of the container 16. In certain embodiments, the cap 13 may have an inner threading for such engagement. Meanwhile, the inner portion 12 fluidly seals the inner diameter/perimeter of the opening of the container 16, and the flavoring member 10 extends into the compartment of the container 16 housing the fluid 18. The presence of the flavoring member 10 in the fluid 18 enables a wicking action and/or capillarity, drawing the flavor element of the flavoring member into the fluid 18. The wicking works like the wicking that takes place in a wooden barrel, causing a barrel-like aging effect to take place with the fluid 18 in the container, for improving the taste of the fluid over a duration of time.

The flavoring member 10 may be an elongated (having a longitudinal length greater than its width/diameter) piece of round or flat wood having a distinctive taste or flavor. For instance, the flavoring member 10 may be made from white oak wood/or any other flavorful wood. The longitudinal length and width/diameter may vary between flavoring members 10 depending on the container 16. For instance, the flavoring member 10 may be an approximately ⅜" round× 8". In other embodiments, the flavoring member 10 may be longer or shorter than 8" and having a width/diameter less or more than ⅜".

The flavored rod 10 could be an absorbent material holding a flavor element, that is released into the fluid 18. The flavor element may be one of a plurality of flavor elements that can be added to the flavoring member 10. The plurality of flavor elements may come in a kit. The flavoring member 10 could be a spice stick, activated charcoal, fruit or a piece of rope like material that has been dipped in one or more flavor elements.

It should be understood, of course, that the foregoing relates to exemplary embodiments of the invention and that modifications may be made without departing from the spirit and scope of the invention as set forth in the following claims.

What is claimed is:

1. A cap for a container, the cap comprising
a sealing portion; and
a non-wood flavoring member operatively associated with the sealing portion so as to extend into a fluid of the container, the non-wood flavoring member comprising a capillary-porous media providing a plurality of porous fenestrations, each porous fenestration defines an opening having a diameter of 0.5 to 1.2 millimeters for receiving a flavoring element by way of dipping the non-wood flavoring member therein, whereby the fluid extracts the flavoring element therefrom, wherein the capillary-porous media is defined by a plurality of capillaries.

2. The cap of claim 1, wherein the at least one flavoring element is extrinsic to the flavoring member.

3. The cap of claim 1, wherein the sealing portion forms a sealing engagement with an opening of a container.

4. The cap of claim 3, wherein the flavoring member extends downward from the sealing portion into a compartment defined by the container.

5. The cap of claim 4, wherein the flavoring member extends downward from the sealing portion for approximately eight inches.

6. The cap of claim 5, wherein the flavoring member is received in the sealing portion.

7. The cap of claim 1, wherein the flavoring element is wood.

8. A device for flavoring a fluid of a container, the device comprising:
a sealing portion dimensioned and shaped to form a sealed engagement with an opening of the container; and
a non-wood flavoring member operatively associated with the sealing portion so as to extend into a compartment of the container; and
the non-wood flavoring member comprising:
a plurality of fenestrations, each fenestration defines an opening having a diameter of 0.5 to 1.2 millimeters for receiving a flavoring element therein; and
one or more capillaries.

9. The device of claim 8, wherein the flavoring element is wood.

10. The device of claim 9, wherein the one or more capillaries extend between two fenestrations of the plurality of fenestrations.

11. The device of claim 9, wherein the fluid in the compartment enters the one or more capillaries through one of the plurality of fenestration and is flavored by the flavoring element.

* * * * *